United States Patent [19]
Komiyama et al.

[11] Patent Number: 5,847,889
[45] Date of Patent: Dec. 8, 1998

[54] REFLECTING MIRROR FOR AIRPLANE

[75] Inventors: Sakae Komiyama, Warabi; Yoshinori Koyama, Kawaguchi, both of Japan

[73] Assignee: Komy Kogei Co., Ltd., Tokyo, Japan

[21] Appl. No.: 845,030

[22] Filed: Apr. 21, 1997

[30] Foreign Application Priority Data

Sep. 17, 1996 [JP] Japan .................................. 8-281236

[51] Int. Cl.⁶ ............................. G02B 5/08; G02B 7/182
[52] U.S. Cl. .......................... 359/851; 359/850; 359/871
[58] Field of Search ................................... 359/850, 851, 359/853, 871, 546, 547, 548, 549, 550, 551, 552, 553, 627

[56] References Cited

U.S. PATENT DOCUMENTS

| | | |
|---|---|---|
| 3,708,222 | 1/1973 | Stern . |
| 3,806,232 | 4/1974 | Gray ........................................ 359/851 |
| 3,861,785 | 1/1975 | Barbour . |
| 3,908,056 | 9/1975 | Anderson ................................ 359/851 |
| 4,299,442 | 11/1981 | Buckelew ............................... 359/548 |
| 4,301,321 | 11/1981 | Bartels . |
| 4,789,921 | 12/1988 | Aho . |
| 4,800,868 | 1/1989 | Appeldorn et al. . |
| 4,989,125 | 1/1991 | Cobb, Jr. et al. . |

*Primary Examiner*—Ricky D. Shafer
*Attorney, Agent, or Firm*—Nikaido, Marmelstein, Murray & Oram LLP

[57] ABSTRACT

A large number of ring-like grooves having mutually different diameters are concentrically formed on the back of a planar transparent plastic plate to constitute a Fresnel lens having a concave lens function, a reflecting film is provided to the back so as to provide a convex mirror function to the surface of the transparent plastic plate, and a thin metal sheet is bonded to the reflecting film through an adhesive, thereby constituting a reflecting mirror for an airplane cabin.

20 Claims, 5 Drawing Sheets

5,847,889

REFLECTING MIRROR FOR AIRPLANE

BACKGROUND OF THE INVENTION

This invention relates generally to a reflecting mirror for an airplane cabin. More specifically, this invention relates to a reflecting mirror which is flat and yet has a visual field having a wide angle, light weight and flame-retardancy, and is suitable for an airplane cabin.

The main duty imposed on flight crews such as stewardesses of passenger airplanes is to ensure the safety of the passengers. As the size of passenger airplanes has become greater and greater in recent years and the number of passengers per airplane has become as great as some hundreds of passengers, the number of passengers per flight crew has increased, too, and the duty described above has become more and more difficult to fulfill.

Simple means for enabling one crew to observe a greater number of passengers is a method which fits a convex mirror to the wall of a cabin and utilizes the reflected images from the convex mirror. However, because the convex mirror is so fitted by means of a stay as to protrude from the wall, it requires a considerable installation space inside the cabin.

It is convenient to fit a reflecting mirror to the inner wall surface of an overhead bin disposed at a higher position inside the cabin so that even a person of a low stature can confirm the person's baggage in the overhead bin. If the convex mirror is used as this reflecting mirror, however, the overhead bin installation space is decreased due to the installation space of the convex mirror. If an ordinary flat plate mirror is used, on the other hand, the baggage confirmation function cannot be sufficiently fulfilled because the visual field of this flat plate mirror is narrower than that of the convex mirror.

Further, because the convex mirror requires auxiliary members such as the stay for its fitting as described above, the weight per convex mirror becomes great and this heavy weight is in no way desirable for the airplane which must be light as much as possible.

SUMMARY OF THE INVENTION

It is therefore an object of the present invention to provide a reflecting mirror for an airplane cabin which, though having a flat shape, has a wide visual angle equivalent to that of a convex mirror and can be fitted to the wall, the ceiling or the inside of an overhead bin of the cabin without requiring a large space.

It is another object of the present invention to provide a reflecting mirror for an airplane cabin which has a light weight and a flame retardancy both of which are essentially necessary for the airplane application.

To accomplish the objects described above, the present invention provides a reflecting mirror for an airplane cabin which comprises a transparent plastic plate having a large number of ring-like grooves having mutually different diameters on the back thereof and thus forming a Fresnel lens having a concave lens function, a metal reflecting film formed on the back of the transparent plastic plate and providing a convex mirror function to the surface of the transparent plastic plate, and a thin metal sheet bonded through an adhesive to the metal reflecting film.

As described above, the reflecting mirror structure is realized by forming the ring-like grooves on the back of the planar transparent plastic plate to achieve a Fresnel lens structure and providing the reflecting film to the back. Therefore, though the reflecting mirror is planar, it has a convex lens function and a wide visual field. Since it has the planar shape, the reflecting mirror can be fitted to the wall, the ceiling or inside an overhead bin of the cabin without requiring a large installation space.

Because the reflecting mirror of the present invention comprises the transparent plastic plate as the principal component, the reflecting mirror is light in weight. Because the thin metal sheet is bonded to the back of the plastic plate by means of an adhesive, the reflecting mirror has self-extinguishable flame retardancy and can conform with the safety standards of flame retardancy stipulated for materials used in airplane cabins.

DETAILED DESCRIPTION OF THE PREFERRED EMBODIMENTS

Figure 1:
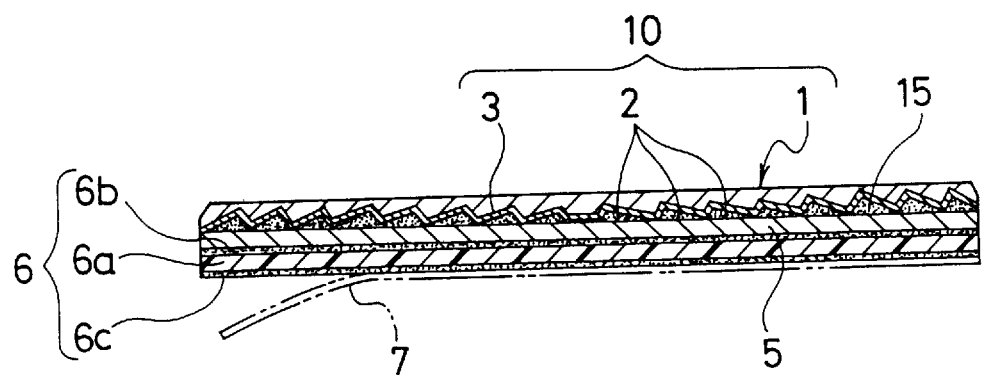
FIG. 1 is a longitudinal sectional view showing the outline of a reflecting mirror for an airplane cabin of one embodiment of the present invention.

In a reflecting mirror of the present invention shown in FIG. 1, reference numeral 1 denotes a transparent plastic plate, and a large number of ring-like grooves 2 are formed concentrically and into step-like shapes on the back of the plastic plate 1. A reflecting film 3 is applied to the surface of these step-like ring-like grooves 2, so that the transparent plastic plate 1 serves as a Fresnel mirror 10 having a convex lens function as a whole.

A thin metal sheet 5 such as an aluminum sheet is bonded to the back of the transparent plastic plate 1 forming a Fresnel mirror 10 by means of an adhesive 15. A double-sided adhesive tape 6 is bonded to the outside of the thin metal sheet 5 and furthermore, releasing paper 7 is bonded to the adhesive tape 6 so that these members together constitute a reflecting mirror for an airplane cabin.

Figure 2:
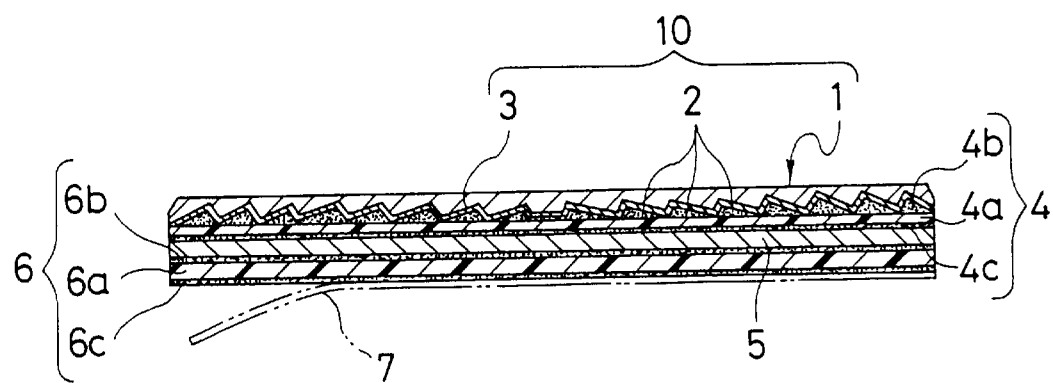
FIG. 2 is a longitudinal sectional view showing the outline of a reflecting mirror of another embodiment of the present invention.

FIG. 2 shows another embodiment of a reflecting mirror according to the present invention, in which a double sided adhesive tape 4 is inserted between the metal reflecting film 3 and the thin metal sheet 5 in the embodiment shown in FIG. 1.

In the above mentioned embodiments of FIGS. 1 and 2, the double-sided adhesive tape 4 is made of a substrate tape 4a and adhesives 4b and 4c applied to both surfaces of the substrate tape 4a, and also the double-sided adhesive tape 6 is similarly made of a substrate tape 6a and adhesives 6b and 6c applied to both surfaces of the substrate tape 6a. A woven fabric, a non-woven fabric, a resin film, or the like, is preferably used as the substrate tapes 4a and 6a, and an elastic polymer is preferably used as the adhesives 4b, 4c and 6b, 6c.

Each of the reflecting mirrors for an airplane cabin having the construction shown in FIGS. 1 and 2 is fitted in such a manner as not to occupy the space inside the cabin by first peeling releasing paper 7 as shown by chain lines in the drawing to expose the adhesive 6c of the double-sided adhesive tape 6, and then bonding the mirror through this adhesive 6c to the wall, the ceiling, etc, of the cabin.

Figure 4A:
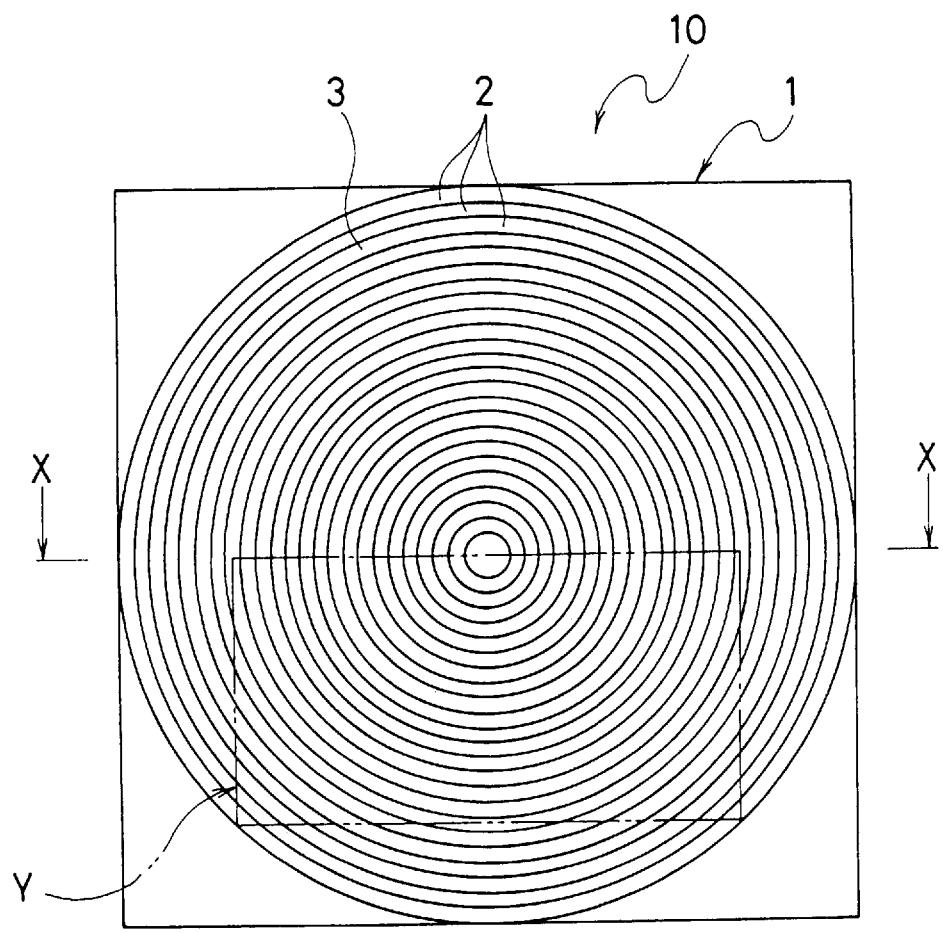
FIG. 4A is a bottom view showing the outline of a Fresnel mirror constituting the reflecting mirror of the present invention.
Figure 4B:
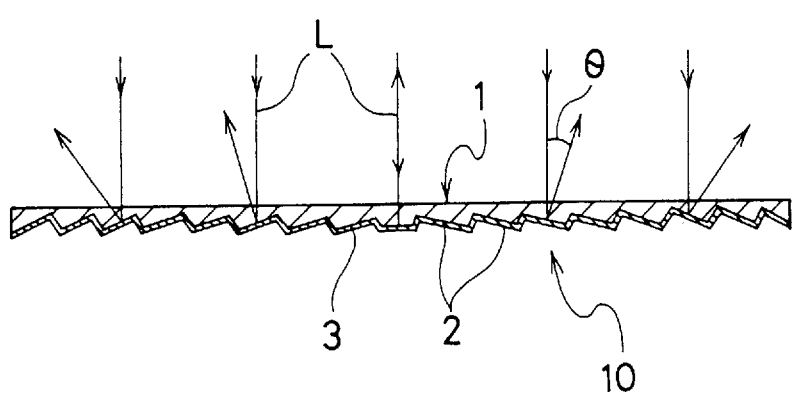
FIG. 4B is a sectional view taken along line X—X of FIG. 4A.

FIGS. 4A and 4B show in detail the structure of the Fresnel mirror 10 described above.

A large number of ring-like grooves having mutually different diameters are formed concentrically and into the step shape on the back of the transparent plastic plate 1. The groove bottom of each ring-like groove 2 inclines in a radial direction with respect to the plane, and the greater the diameter of the ring-like groove 2, the greater becomes the angle of inclination of the groove bottom.

A large number of ring-like grooves 2 are shown with rough pitches for easy illustration of the drawings. Actually, however, they are arranged in a small pitch of 0.1 to 0.5 mm, preferably 0.2 to 0.3 mm. The transparent plastic plate 1 having the ring-like grooves 2 at such a fine pitch forms a Fresnel lens which per se has a concave lens function.

Further, the reflecting film 3 is provided on the back of the transparent plastic plate 1 having a large number of ring-like grooves 2. This reflecting film 3 comprises a metal vacuum deposition film or a metal plating film, and is formed by vacuum deposition of a metal such as aluminum or by electroplating. Because the reflecting film 3 is formed in this way, the surface side of the transparent plastic plate 1 serves as a Fresnel mirror 10 having a convex lens function.

In other words, as shown in FIG. 4B, the rays of light L incident on the surface side of the transparent plastic plate 1 are reflected by the reflecting film 3. However, because the angle of reflection θ of the ray of light reflected at the ring-like groove 2 of the reflecting film 3 farther from the center of the concentric circle increases, it has entirely the same function as that of a convex lens.

This function will be explained in comparison between the Fresnel mirror 10 shown in FIG. 5 and the convex lens 40 shown in FIG. 6.

Figure 5:
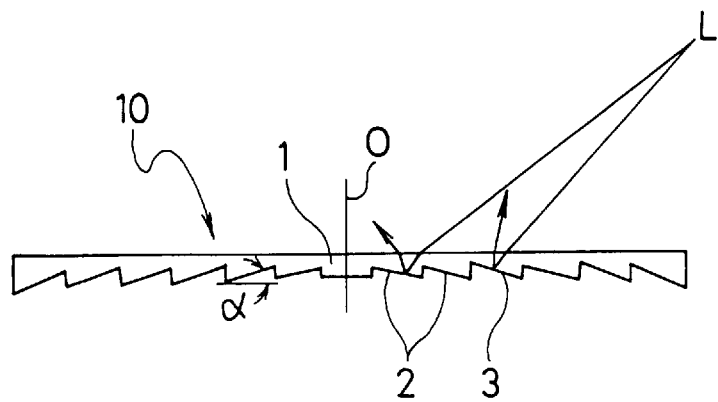
FIG. 5 is a longitudinal sectional view schematically showing a Fresnel mirror used in the present invention.
Figure 6:
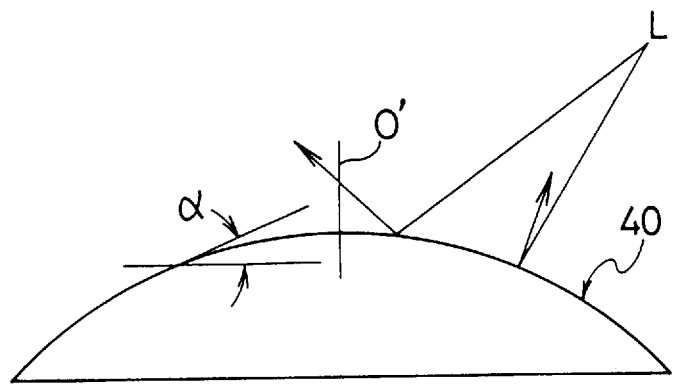
FIG. 6 is a side view schematically showing a convex mirror according to the prior art.

In other words, the Fresnel mirror 10 shown in FIG. 5 corresponds, in principle, to a mirror where a large number of ring-like bodies whose radii are serially increasing in steps of 0.1 to 0.5 mm are sliced concentrically with respect to the center O' of the surface of the spherical convex mirror 40 shown in FIG. 6 and are re-arranged into a planar state as the ring-like grooves 2 in the Fresnel mirror 10. Therefore, the angle α of inclination is smaller for the inclined groove 2 closer to the center O and progressively greater for the inclined groove 2 farther from the center O. Because the inclined groove 2 farther from the center reflects the rays of light at a greater angle of reflection, the Fresnel mirror 10 has the same wide angle of reflection as that of the convex mirror 40.

Figure 3:
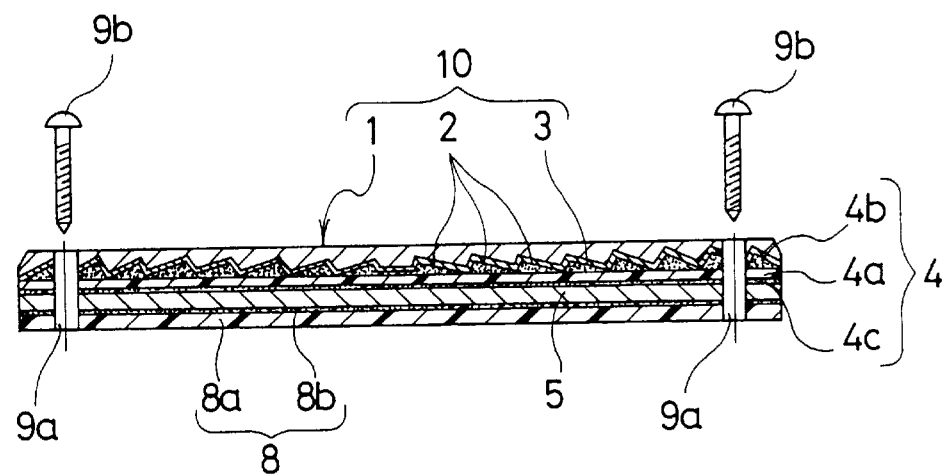
FIG. 3 is a longitudinal sectional view showing the outline of a reflecting mirror for an airplane cabin of another embodiment of the present invention.

FIG. 3 shows a reflecting mirror for an airplane cabin of another embodiment according to the present invention.

This reflecting mirror uses screws when it is fitted to the ceiling or the wall of the cabin instead of using the double-sided adhesive tape of the first embodiment.

To accomplish this screw fitting, through holes 9a are bored at the corners of the reflection mirror, and the reflecting mirror is fixed to the wall surface or the ceiling by inserting the screws 9b through these through holes 9a. Since the reflecting mirror is fixed with the screws, the double-sided adhesive tape 6 used in each of the embodiments shown in FIGS. 1 and 2 is not used, and a one-sided adhesive tape 8 is instead bonded.

This one-sided adhesive tape 8 is produced by applying an adhesive 8b to one of the surfaces of a substrate tape 8a and is bonded so that its side not having the adhesive faces outside. However, this one-sided adhesive tape 8 is disposed for protecting the external surface of the thin metal sheet 5 and is not always necessary for the present invention.

The Fresnel mirror that constitutes the reflecting mirror of the present invention need not always contain the center of the concentric circles of the ring-like grooves, but a portion deviated from the center of the concentric circles may be cut out as typically shown by a rectangle Y encompassed by two-dotted line in FIG. 4A. The cut-out portion and its shape may be selected in accordance with the bonding position such as the wall or the ceiling of the cabin so that the best visual field can be obtained.

In the present invention, the resin used for the transparent plastic plate is not particularly limited so long as it is a transparent resin. Examples of the resin include those which have high transparency such as polycarbonate, polyacrylic, polystyrene, and so forth. Among them, polycarbonate is most suitable from the aspects of the strength and transparency.

A light metal is preferably used as the metal of the thin metal sheet, and aluminum is most preferred. The thickness of this thin metal sheet is 0.01 to 2 mm, preferably within the range of 0.02 to 1 mm. The following two kinds of the flame-retardancy requirements stipulated for the materials of airplane cabins can be both satisfied by bonding such a thin metal sheet to the transparent plastic plate.

In other words, the flame-retardancy requirements set forth for the materials of airplane cabins by the Ministry of Transport, Japan, stipulate that the material must be self-extinguishable when subjected to a vertical burning test. More concretely, the mean burning length must not exceed 15 cm, the mean burning time must not exceed 15 seconds after a fire source is removed, and a dripping matter from the sample must not continue burning beyond the mean time of 3 seconds after it drip.

In the case of airplanes having a passenger capacity of at least 20 passengers, the mean burning length must not exceed 20 cm in the vertical combustion test, the mean burning time must not exceed 15 seconds after the fire source is removed, and a dripping matter from the sample must not continue burning beyond 5 seconds, in addition to the flame-retardancy requirement described above.

In the present invention, the adhesive used for bonding the thin metal sheet to the transparent plastic plate is preferably made of an elastic polymer, and preferable examples are acrylic polymer and urethane polymer.

Because the transparent plastic plate and the thin metal sheet have mutually different coefficients of expansion, their expansion lengths are different depending on the temperature condition, and they may separate from each other depending on the selection of the adhesive. When such an adhesive of elastic polymer is used as described above, however, the adhesive follows the deformation of the bonded portion and prevents the residual stress from remaining on the interface. Therefore, this adhesive can prevent the occurrence of mutual peel.

The adhesive is preferably a non-solvent type adhesive not containing a solvent. If a solvent is contained in the adhesive, it permeates into the resin of the transparent plastic plate, lowers the transparency and results in degrading the function of the reflecting mirror.

The reflecting mirrors of the present invention illustrated in FIGS. 1 to 3 can be fitted flat to the wall, the ceiling or inside the overhead bin of the airplane cabin in such a manner as not to occupy a large fitting space.

Figure 7:
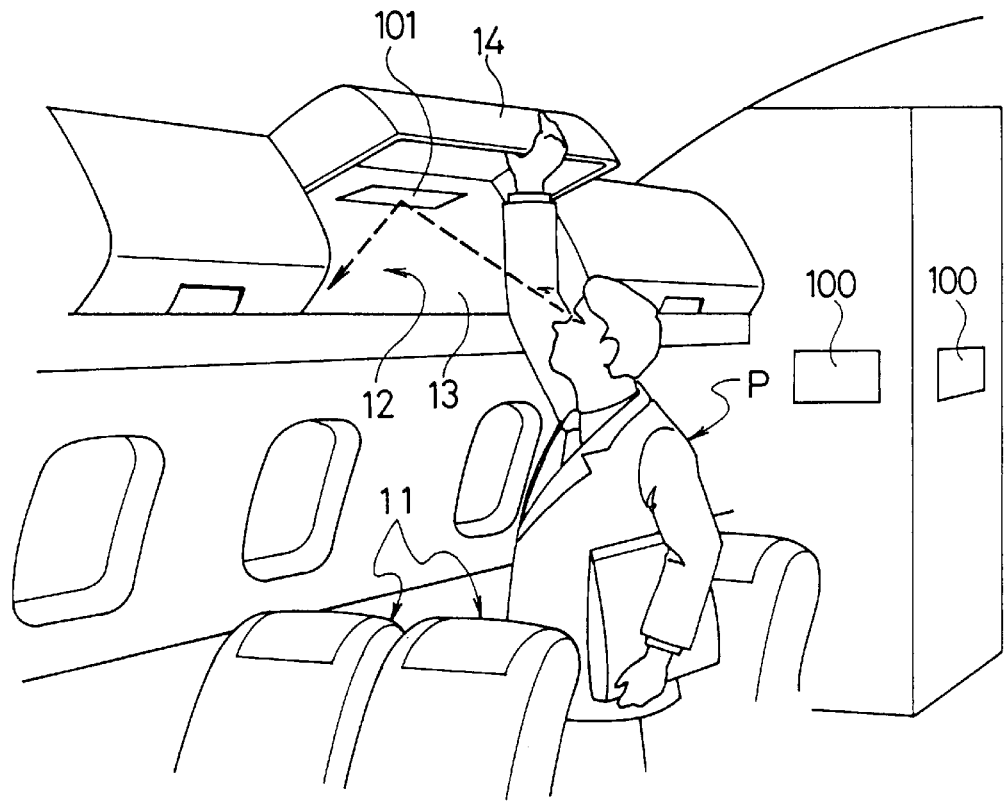
FIG. 7 is an explanatory view showing the fitted state of the reflecting mirror of the present invention inside an airplane cabin.

FIG. 7 shows an example where the reflecting mirror of the present invention is fitted into the cabin of an airplane.

In FIG. 7, the overhead bin 12 is disposed above the seat 11, and only its inlet side 13 can be opened. A cover 14 is fitted in such a manner that it can be opened and closed up and down, with the upper side of the inlet 13 being the support point. The inside of the overhead bin 12 is enclosed by the upper surface, the bottom surface, the right and left side surfaces and the back or wall surface.

The reflecting mirror 100 according to the present invention is fitted flat to the wall surface provided behind the sheet 11. Another reflecting mirror 101 is also fitted flat to the inner upper surface of the overhead bin 12 near the inlet 13. This reflecting mirror 101 may be bonded to both, or either of the right and left side surfaces in addition to the upper surface near the inlet 13, as shown in the drawing. It may be bonded further to the back of the cover 14. When the reflecting mirrors are bonded to the right and left side surfaces, however, they are likely to be damaged because baggage touches the mirror when the baggage is put into and taken out of the overhead bin. Therefore, the reflecting mirrors are preferably bonded to the upper surface near the inlet 13 and the back of the cover 14.

Because the reflecting mirrors 100 and 101 fitted in this way each include a planar transparent plastic plate to serve as a Fresnel lens structure and the reflecting film bonded to its back, though they have a planar shape, they provide a visual field having a wide angle corresponding to a convex mirror to the passenger and to allow the passenger to look around the cabin or to look into the corners inside the overhead bin. Since they are planar, these reflecting mirrors can be fitted flat to the wall without occupying a large space.

Because the reflecting mirror comprises a transparent plastic plate as the principal component, it is light in weight. Because the thin metal sheet is bonded to the back of the transparent plastic plate by the adhesive, the reflecting mirror has the self-extinguishable flame-retardancy property and can satisfy the safety standards as the component for an airplane cabin.

The reflecting mirror 101 bonded to the upper surface of the overhead bin 12 near the inlet and/or both side surfaces, in particular, makes it possible even for a man of short stature who cannot see the bottom surface of the overhead bin 12 as shown in FIG. 7 to see substantially the whole area of the bottom surface of the overhead bin 12 through the reflecting mirror 101.

Figure 8:
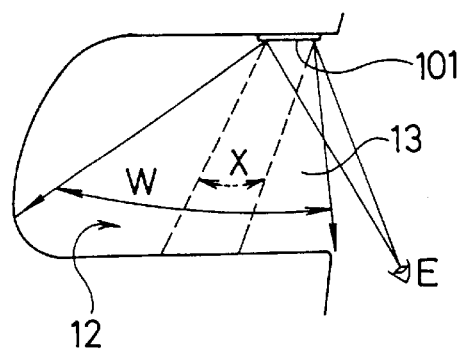
FIG. 8 is an explanatory view showing the function and effect obtained when the reflecting mirror of the present invention is fitted inside an overhead bin.

Moreover, the reflecting mirror 101 has the function of a wide angle reflecting function due to its Fresnel structure. Therefore, as shown in the explanatory view of FIG. 8, the reflecting mirror 101 can ensure the visual field of a wide angle W to look over the entire portion of the bottom of the overhead bin 12 whereas an ordinary plane mirror can provide only the visual field of a small angle X for an eye E. Therefore, even the passenger P of a low stature can easily recognize thin or small bags which cannot be otherwise viewed directly from below. Since the reflecting mirror 101 is planar and is moreover bonded flat to the wall of the overhead bin, it does not reduce the baggage accommodation space and does not cause any problem when the baggage is put into and taken out of the overhead bin 12.

What is claimed is:

1. A reflecting mirror for an airplane cabin comprising:
    a transparent plastic plate having a large number of ring-like grooves having mutually different diameters formed on a back thereof, and constituting a Fresnel lens having a concave lens function;
    a metal reflecting film formed on the back of said transparent plastic plate, providing a convex mirror function to said transparent plastic plate; and
    a thin metal sheet bonded through an adhesive to said metal reflecting film, said adhesive being made from an elastic polymer,
    said reflecting mirror being fitted flat to the wall of an airplane cabin.

2. A reflecting mirror for an airplane cabin according to claim 1, wherein said adhesive comprises a double sided adhesive tape inserted between said metal reflecting film and said thin metal sheet.

3. A reflecting mirror for an airplane cabin according to claim 1, wherein the pitch of a large number of said ring-like grooves is 0.1 to 0.5 mm.

4. A reflecting mirror for an airplane cabin according to claim 1, wherein the thickness of said thin metal sheet is 0.01 to 2 mm.

5. A reflecting mirror for an airplane cabin according to claim 1, wherein a double-sided adhesive tape is further bonded to the outside of said thin metal sheet.

6. A reflecting mirror for an airplane cabin according to claim 1, wherein a one-sided adhesive sheet is further bonded to the outside of said thin metal sheet.

7. A reflecting mirror for an airplane cabin comprising:
    a transparent plastic plate having a large number of ring-like grooves having mutually different diameters formed on a back thereof, and constituting a Fresnel lens having a concave lens function;
    a metal reflecting film formed on the back of said transparent plastic plate, providing a convex mirror function to said transparent plastic plate; and
    a thin metal sheet bonded through an adhesive to said metal reflecting film,
    said reflecting mirror being fitted flat to at least one of an upper wall surface near an inlet of an overhead bin having an openable input side and which is provided at an upper part of a cabin of an airplane, a right end wall surface of said bin, and a left end wall surface of said bin.

8. A reflecting mirror for an airplane cabin according to claim 7, wherein said adhesive comprises a double sided adhesive tape inserted between said metal reflecting film and said thin metal sheet.

9. A reflecting mirror for an airplane cabin according to claim 7, wherein the pitch of a large number of said ring-like grooves is 0.1 to 0.5 mm.

10. A reflecting mirror for an airplane cabin according to claim 7, wherein the thickness of said thin metal sheet is 0.01 to 2 mm.

11. A reflecting mirror for an airplane cabin according to claim 7, wherein said adhesive is made from an elastic polymer.

12. A reflecting mirror for an airplane cabin according to claim. 7, wherein a double-sided adhesive tape is further bonded to the outside of said thin metal sheet.

13. A reflecting mirror for an airplane cabin according to claim 7, wherein a one-sided adhesive sheet is further bonded to the outside of said thin metal sheet.

14. A reflecting mirror for an airplane cabin comprising:

a transparent plastic plate having a large number of ring-like grooves having mutually different diameters formed on a back thereof, and constituting a Fresnel lens having a concave lens function;

a metal reflecting film formed on the back of said transparent plastic plate, providing a convex mirror function to said transparent plastic plate; and a thin metal sheet bonded through an adhesive to said metal reflecting film, wherein a cover is disposed to an inlet of an overhead bin having an openable inlet side and which is provided at an upper part of a cabin of an airplane, and wherein said reflecting mirror is fitted flat to an interior surface of said cover.

15. A reflecting mirror for an airplane cabin according to claim 14, wherein said adhesive comprises a double sided adhesive tape inserted between said metal reflecting film and said thin metal sheet.

16. A reflecting mirror for an airplane cabin according to claim 14, wherein the pitch of a large number of said ring-like grooves is 0.1 to 0.5 mm.

17. A reflecting mirror for an airplane cabin according to claim 14, wherein the thickness of said thin metal sheet is 0.01 to 2 mm.

18. A reflecting mirror for an airplane cabin according to claim 14, wherein said adhesive is made from an elastic polymer.

19. A reflecting mirror for an airplane cabin according to claim 14, wherein a double-sided adhesive tape is further bonded to the outside of said thin metal sheet.

20. A reflecting mirror for an airplane cabin according to claim 14, wherein a one-sided adhesive sheet is further bonded to the outside of said thin metal sheet.

* * * * *